Figure 16:
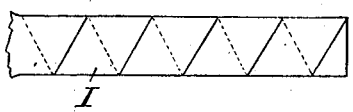

(No Model.) 5 Sheets—Sheet 1.
G. H. ELLIS & J. F. STEWARD.
BALLING MACHINE.
No. 581,274. Patented Apr. 27, 1897.
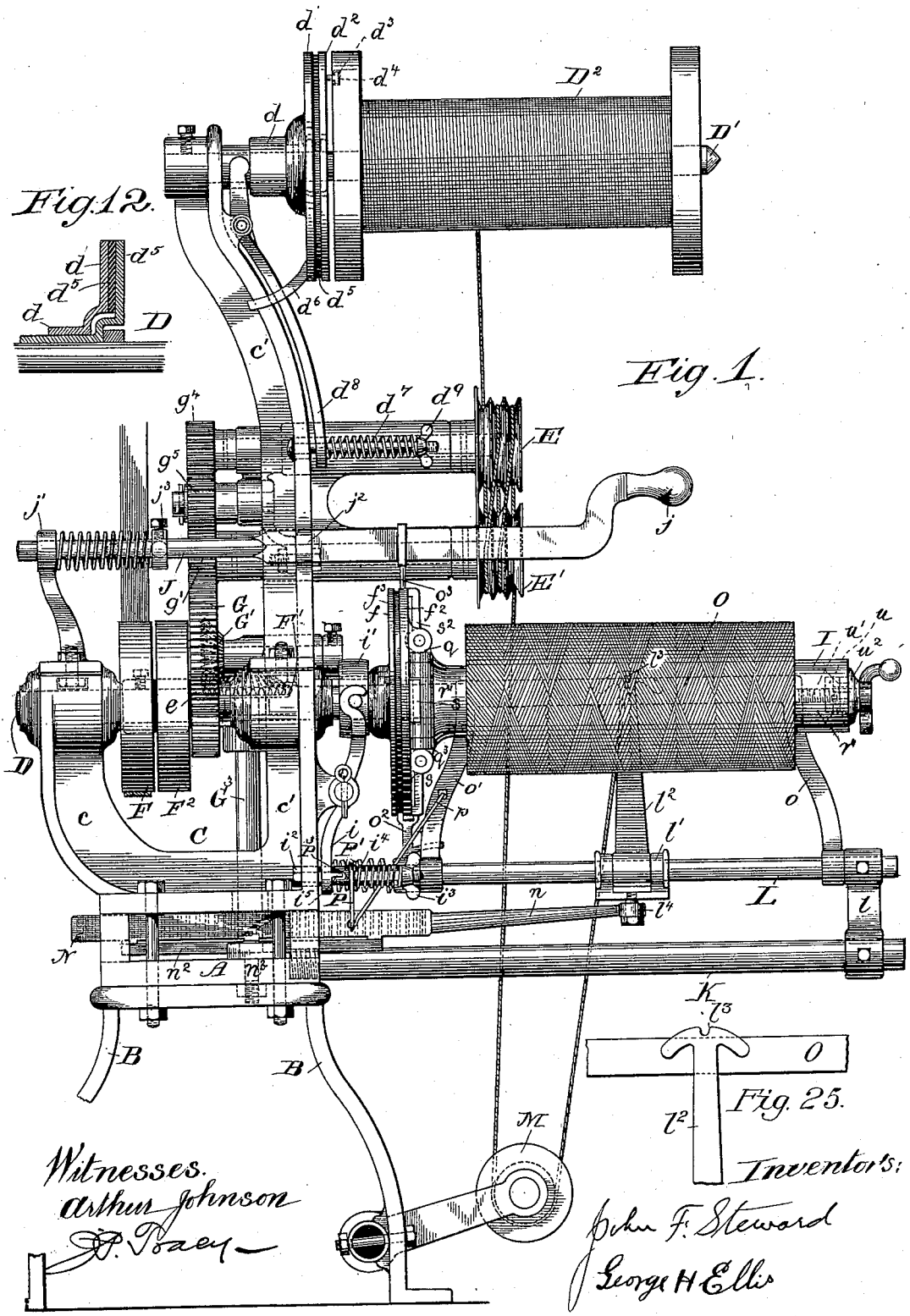
Witnesses.
Arthur Johnson
Inventors:
John F. Steward
George H. Ellis

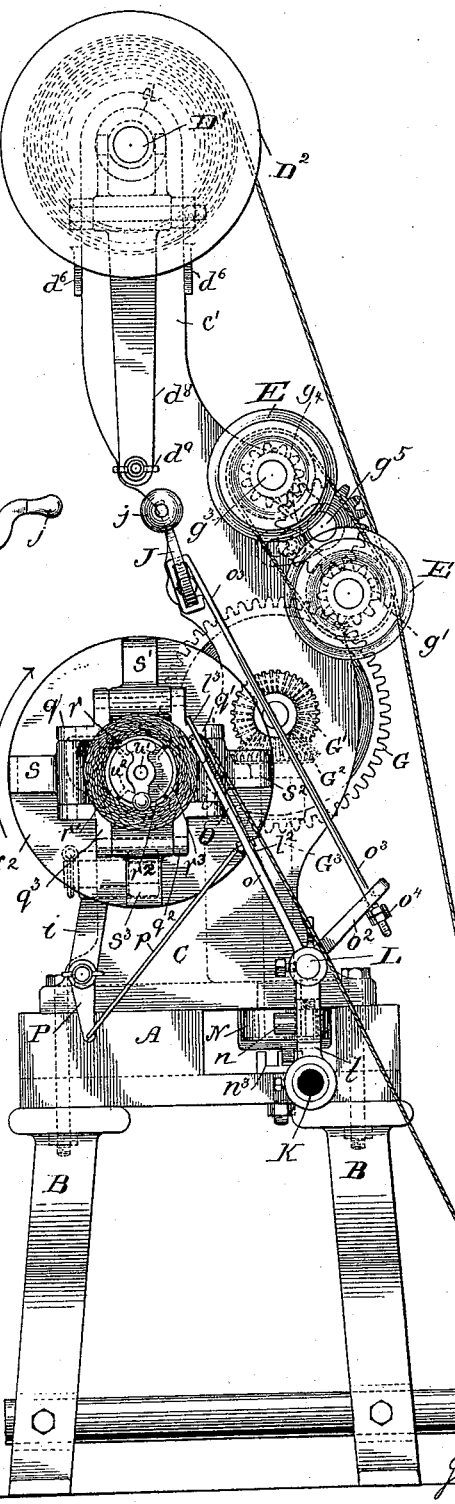
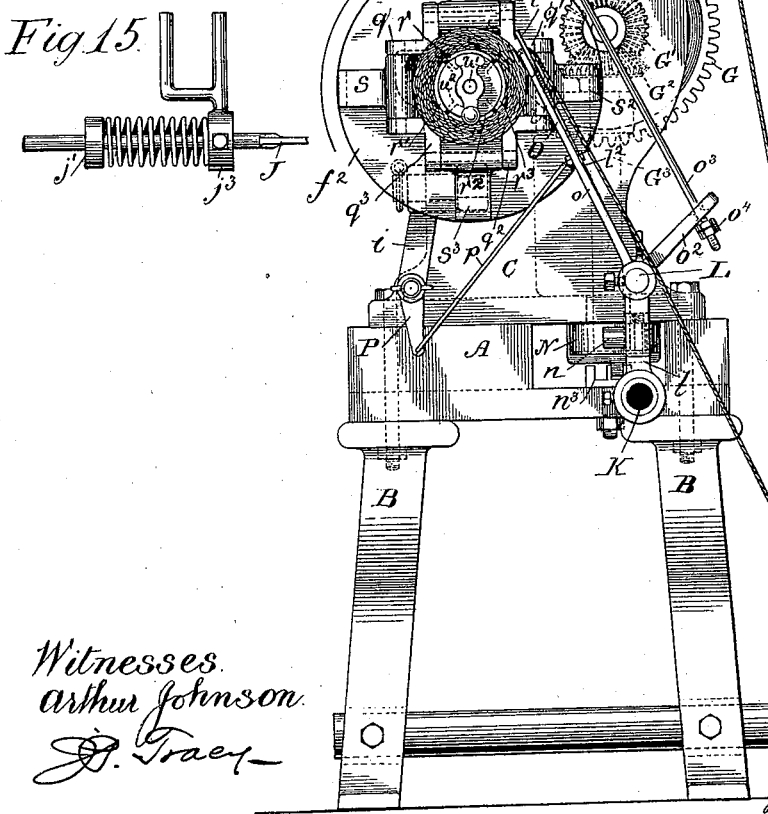

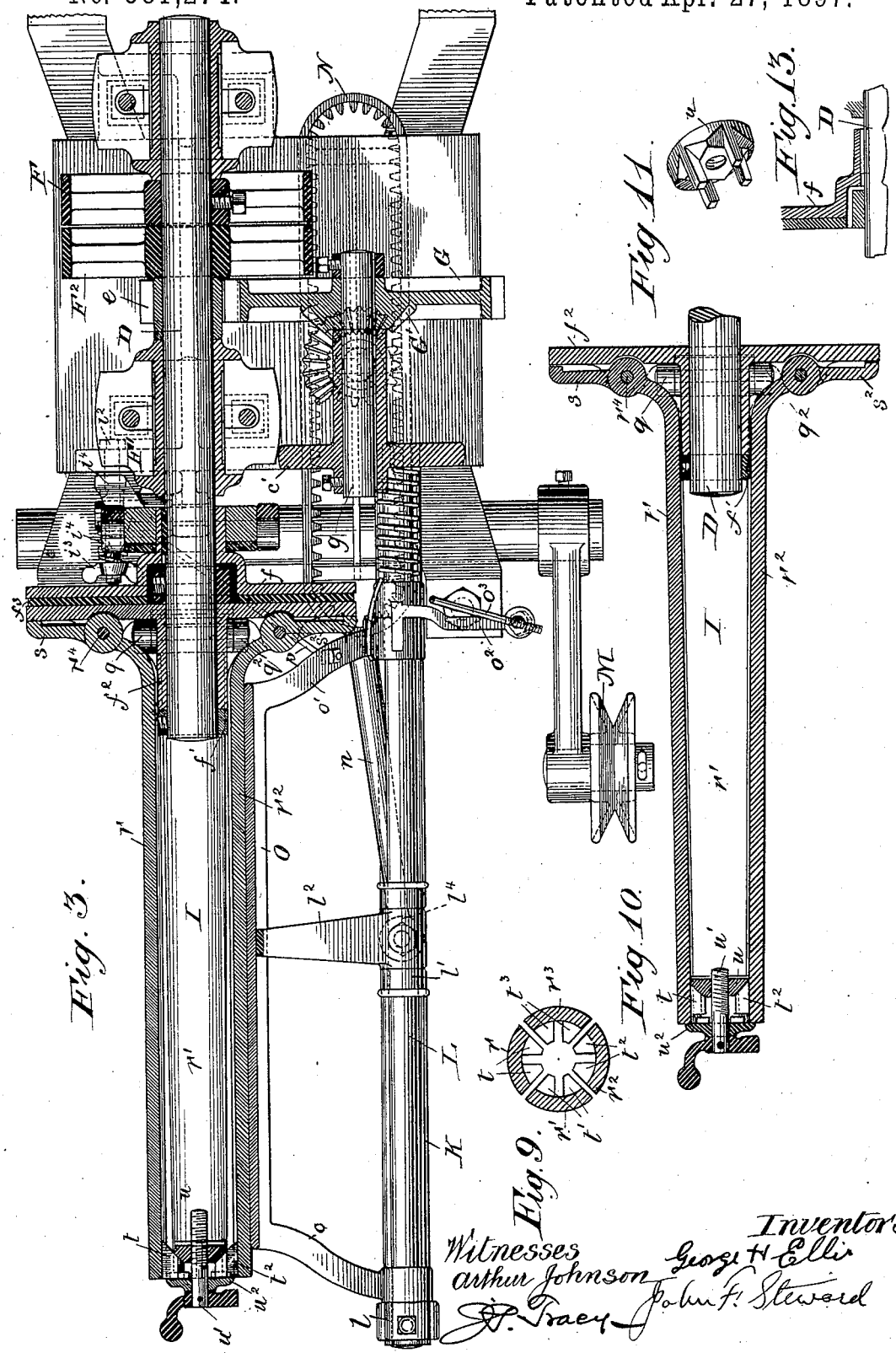

(No Model.) 5 Sheets—Sheet 4.
G. H. ELLIS & J. F. STEWARD.
BALLING MACHINE.
No. 581,274. Patented Apr. 27, 1897.
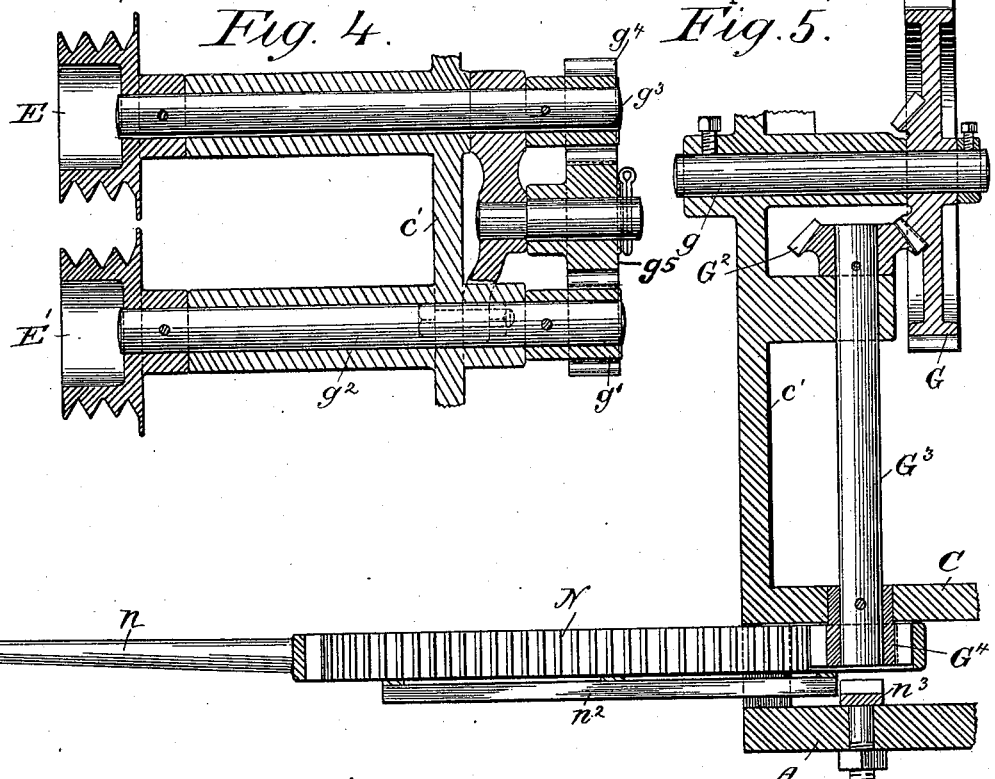
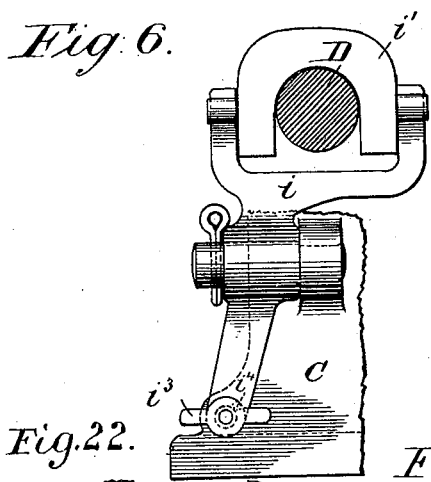
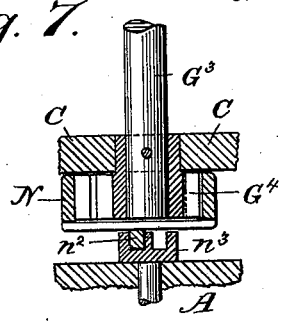
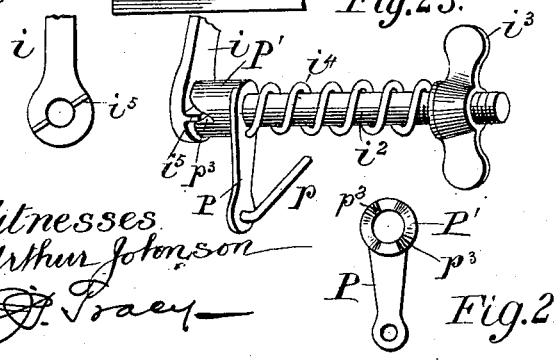
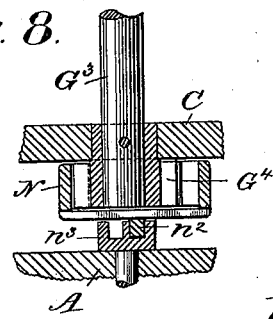
Witnesses
Arthur Johnson
J. Tracy
Inventors
George H. Ellis
John F. Steward (No Model.) 5 Sheets—Sheet 5.

G. H. ELLIS & J. F. STEWARD.
BALLING MACHINE.

No. 581,274. Patented Apr. 27, 1897.

Witnesses
Arthur Johnson
J. P. Tracy

Inventors
George H Ellis
John F. Steward

UNITED STATES PATENT OFFICE.

GEORGE H. ELLIS AND JOHN F. STEWARD, OF CHICAGO, ILLINOIS.

BALLING-MACHINE.

SPECIFICATION forming part of Letters Patent No. 581,274, dated April 27, 1897.

Application filed January 12, 1895. Serial No. 534,686. (No model.)

*To all whom it may concern:*

Be it known that we, GEORGE H. ELLIS and JOHN F. STEWARD, of Chicago, in the county of Cook and State of Illinois, have invented certain new and useful Improvements in Balling-Machines Adapted to Lay Twines in the Form of Cylinders, of which the following is a full specification, reference being had to the accompanying drawings, in which—

Figure 1 is a right-hand side elevation; Fig. 2, a left-hand end elevation; Fig. 3, a sectional plan view; Fig. 4, a sectional view of the haulers; Fig. 5, a sectional view of the devices for producing the necessary motions to so lay the twine as to form it into a cylinder. Figs. 6, 7, 8, 9, 10, 11, 12, 13, 14, and 15 are details of construction, and Figs. 16, 17, 18, 19, 20, and 21 represent the ball in six stages of its manufacture. Figs. 22, 23, and 24 are details of construction. Fig. 25 is a detail showing the twine-guide and twine-laying device.

The object of the invention is to put twine in substantially cylindrical form, so that the largest amount of twine possible can be wound in a given space.

The machine is particularly intended for winding binder-twine, in order that by compact winding and length of ball the frequent necessity for resupplying twine to a self-binder may be avoided.

We are aware that it is not new to lay up so-called "balls" of twine in cylindrical form, but we are not aware that it is old to produce a ball of the kind that we show and describe and claim. As we wind the twine it is so laid that a "finish" is not secured except as certain diameters are reached. In order that the cylinder may have a finish when about eight inches in diameter, a suitable size for use in grain-binders, we so proportion the relative speeds of the haulers and the feeding device as to reach the result.

A may be considered as a bed-piece of such length that on its several balling-machines may be secured. The bed-piece is properly supported upon suitable legs B at such height as to raise the machine so far above a floor as to be convenient to the operator.

C is a supporting-head having the vertical arms $c$ and $c'$, the latter preferably extending to such height as to sustain the spool from which the twine that is being balled is drawn.

In suitable bearings is the main driving-shaft D, having a loose pulley as well as a tight pulley, by which it is to be driven, or other suitable driving mechanism, if desired, and also carrying gearing by which the haulers and the cord-laying devices are driven. This shaft also supports and imparts motion to the spindle upon which the twine is to be wound.

Upon the upreaching arm $c'$ is secured the spindle $D'$, outreaching therefrom, as shown in Fig. 1. Upon the spindle $D'$ is supported the non-rotatable flanged collar $d$. This collar is prevented from rotating by the arm $d^6$, projecting therefrom, which strikes the frame. It is nevertheless adapted to be moved toward the spool which is adjacent thereto. The disk $d^2$ is rotatably secured to the spindle and has the button $d^3$, adapted to enter the groove $d^4$ in the flange of the spool $D^2$.

$d^5$ is a pad of leather or other suitable friction-producing material.

In order that the flange $d'$ may be forced against the disk $d^2$ and produce the required amount of friction necessary for keeping the twine taut that is being wound, a spring $d^7$ upon a suitable bolt secured in the main frame is provided and adapted to exert its pressure upon a lever $d^8$, fulcrumed on the part $c'$ of the main frame that shall in turn impart the pressure to the hub $d$ and the latter be forced in a longitudinal direction by the adjustment of the thumb-nut $d^9$. The shaft D, being driven from any suitable motive power, has a constant rate of rotation, and the haulers E and E', being connected directly to the positively-acting driving-gearing, also have a constant rate of rotation.

Upon the shaft D is the pinion $e$, adapted to mesh into the gear G on the spindle $g$. This gear G is also adapted to drive the pinion $g'$, secured to the shaft $g^2$, upon the other end of which is the hauler E', as seen in Fig. 4. In order that the fellow hauler E may rotate in the proper direction, a shaft $g^3$ is sustained in the same support, (also shown in Fig. 4,) the shaft having secured at the driven end the pinion $g^4$. Upon a suitable stud and meshing with the pinions $g'$ and $g^4$ is the intermediate pinion $g^5$. The shafts $g^2$ and $g^3$ are journaled in a support secured to the upreaching arm $c'$ of the main frame. This support, however, may be made as one piece with the said upreaching portion of the frame, if preferred. Upon one side of the gear G is the bevel-gear G', and intermeshing with this is the gear $G^2$ upon the upper end of a shaft $G^3$, suitably supported in bearings of the main frame. At the lower end of the said shaft is the spur-pinion $G^4$. By this latter the twine-laying devices are positively moved, as will be described.

From the above it will be seen that the main driving-shaft D, and consequently all parts driven by positive gearing from it—namely, the haulers and the twine-laying devices—are given a definite rate of movement. This fact must be clearly understood, and it must be also understood that the spindle upon which the twine is wound is not moved positively or at a given rate of rotation, but that its rate of rotation depends upon its size and that of the cylinder of twine that is being formed. The haulers are given as many grooves as are necessary to produce a sufficient amount of "traction," as it may be termed, to pull the twine with a positive force from the spool $D^2$, notwithstanding the frictional resistance of the latter, and the spindle upon which the ball is to be wound is driven with sufficient force not only to positively take the twine fed to it by the haulers, but aid in producing enough friction in the grooves of the haulers to make them draw the twine positively from the spool $D^2$.

The spindle I is driven by a friction-clutch in any suitable manner, but for convenience we sustain it upon and drive it by the shaft D, as will be seen in Figs. 3, 9, 10, and 11, where its details of construction are also made clear.

In Fig. 3 the shaft D is shown as extending some distance to the left of the journal-bearing F', and secured thereto is the flange $f$, which may be secured by spline or otherwise, so as to be given a positive rotation, but yet have freedom to move in a longitudinal direction. The necessary construction of the hub, flange, and spline is shown in Fig. 13, which being a common expedient needs no description. To the immediate end of the overhanging portion of the shaft D is pinned the collar $f'$, and freely supported upon the end of the shaft is the flange $f^2$. Lying between the flanges $f$ and $f^2$ is the leather pad $f^3$. The flange $f^2$ is not free to move in a longitudinal direction. Upon the main frame in suitable lugs is pivoted the lever $i$, and upon the shaft D is loosely supported the ring $i'$, having trunnions thereupon or other suitable means for connecting the lever $i$ to the flange $f$. Upon the bolt $i^2$, suitably secured to the frame and having a thumb-nut $i^3$, is a spring $i^4$. By adjustment of the thumb-nut the tension of the spring may be increased or decreased, and consequently the pressure upon the flange $f$ in the direction of the disk $f^2$ may be increased or decreased, the pad $f^3$, preferably of leather, serving as a washer to make the friction of this what may be termed a "friction-clutch" as regular as possible. The details of construction of this friction-clutch may be varied and still remain within the scope of our invention.

The tight pulley F and the loose pulley $F^2$ on the shaft D are chosen as the best means for giving rotation to the machine from any suitable counter-shaft above, but a clutching device of any form may be used. When a belt and the loose pulleys are used, however, as we prefer, a belt-shipper is provided, as shown in Fig. 1, where J is a slide having the handle $j$ supported in an arm $j'$ and in a suitable slot $j^2$ in the main frame. The slot $j^2$ is made of such vertical length that the slide J can be raised at that point. On the upper side of the arm J is cut a notch that engages the upper limit of the slot in which the slide moves, as shown in Fig. 14. Upon the slide J the collar $j^3$ is secured by a set-screw. This collar is made as shown in Fig. 15, having prongs projecting therefrom and adapted to act as a belt-shipper. Between this collar and the arm $j'$ is the spiral spring, which is adapted to force the slide in such a direction as to carry the belt onto the loose pulley $F^2$, when the said slide is set free from the notch, which setting free is accomplished by moving its handle end downward until the notch in the slide is freed from the lock that enters it, in order to hold the shipper in such position as to maintain the belt on the tight pulley. This arrangement for shipping the belt is in fact a stop-motion that is controllable by hand or by the size of the ball that is being formed.

The twine-laying devices consist of a guide that traverses along the surface of the cylinder that is being formed and mechanism for driving the said guide at a constant rate of speed. By "constant rate of speed" is meant one that shall have a substantially constant rate of longitudinal movement back and forth along the forming cylinder in order that the ball may be as nearly a straight cylinder as possible. The twine-laying arm may be rocked upon an axis, but we prefer to give it a sliding movement by means which will now be explained. Outreaching from the base of the machine is an arm K for supporting the said twine-controlling devices. Immediately above this is the guide-rod L, suitably supported at one end in the frame and at its outer end to the strut $l$. Upon this is adapted to be slid the cross-head $l'$. Loosely between the arms of the cross-head, upon the rod L, is pivoted the upreaching arm $l^2$, having the twine-carrying notch $l^3$. Upon either side of the notch a portion of the arm extends and drops a little, leaving the bottom of the notch somewhat higher than the extending portions. Near the floor upon which the machine stands is a sheave M, which may be supported in any manner. Its object is to furnish something around which the twine may be drawn at some distance from the guiding-notch of the cord-laying device, so that the horizontal movement of the latter shall not produce an undesirable amount of loosening and slackening of the twine because of the fact that the distance between the sheave and the notch in the laying devices is not constant. In order to give movement to the cord-laying arm, a double internal rack is used. (Shown in sectional detail in Figs. 5, 7, and 8 and shown in proper positions in the remaining figures.) Upon the lower end of the shaft $G^3$ is, as stated, the pinion $G^4$.

N is the internal rack referred to, its parallel sides being slightly farther apart than the diameter of the pinion $g^4$ and of such length that when moved by the pinion it will carry the twine-laying arm connected thereto, by an extension $n$, the proper distance along the spindle upon which the cylinder of twine is being formed. The extension of the internal rack is pivoted to the cross-head at $l^4$, and its positive end is so controlled that it may be moved in its supports in a direction transverse to its length. The necessity of this will be made clear when it is explained that, as we have chosen to construct this portion of the machine, the pinion must first engage one of the parallel sides of the rack and then the other. Midway between but lower than the racks is formed upon them the guide $n^2$. This guide may be secured to the internal rack in any suitable manner. We have shown it as if formed thereon in casting. Reference to Fig. 1 will show that it falls short of the length of the rack at each end.

In Fig. 2 will be seen a doubly-grooved guide-block $n^3$, secured by a bolt to the bed-piece. The guides in this are so adapted that the slide $n^2$ will be guided in either one. It is located, preferably, immediately below the end of the shaft $G^3$, as also seen in Figs. 5, 7, and 8.

Turning now to Fig. 5, where the internal rack is for the present purpose best shown in section, it is seen that the pinion $G^4$, also shown in section, is at the end of the internal rack and in such a position that its teeth are engaging those that extend from one parallel portion of the rack, in which position the teeth of the pinion can but have the effect of moving the rack in a direction transverse to its length, as before stated, in which case the slide $n^2$, having passed out of one of the notches in the guide $n^3$, will be moved laterally, and as the teeth of the pinion begin to engage the other and parallel portion of the rack the slide $n^2$ will be forced into a new notch of the guide and there held until the slide has passed out at the other end, when the action of the pinion will be such as to move the rack transversely again, but in the opposite direction, and thus force the slide into the former notch in the guide. The size of the pinion and the distance between the parallel sides of the rack are such that the latter is thrown from one position to the other very quickly, and the result is that when the twine has been carried by the guide-notch that is moved by this rack it is quickly turned at the end of its stroke and given a receding movement until the other end of the rack is reached. Near the ends of the rod L is pivoted a guide O. (Shown in full and dotted lines in Figs. 1 and 2 and in full lines in Fig. 3.) This guide is pivoted upon the rod L and free to have its upper portion moved to and from the cylinder of twine that is being formed upon the bar L as an axis. The purpose of this is to so affect the stop-motion that when the ball has reached a predetermined size the machine will be automatically thrown out of operation. It also serves as a guide over which the arm having the cord-laying notch may move freely. It may be said to perform several independent functions and will be so considered in drawing several of the claims, the function not yet mentioned being that of supporting the twine before it has been placed in the notch of the twine-laying arm, so that the latter in its movement may "pick it up," so to speak, thus avoiding the necessity of the attendant when starting a ball placing the twine carefully in the notch.

Turning to Figs. 1 and 2 it will be observed that the belt-shifting guide J has suspended from it a rod $o^3$, which rod at its upper end is constrained to move with the shifter. The shifter may slide through it, if preferred. The straight portion of the guide O is supported upon arms $o$ and $o'$, from the latter of which extends an arm $o^2$, which is provided with an eye through which the rod $o^3$ passes, receiving adjustment-nuts at its lower end therebeneath. It will be best understood, perhaps, by reference to Fig. 2, where the twine-cylinder is still small. As the guide O is spring-held against the cylinder, as shown in Figs. 1 and 3, by means of a spring-arm P and spring the diameter of the cylinder of twine will gradually increase. When the guide O has reached a distance that is predetermined by the adjustment of the screw-nuts $o^4$, the rod $o^3$ will be drawn downward and the slide J be moved from the notch shown in Fig. 14 and thus set free, so that the spring $J'$ can force it endwise and guide the belt onto the loose pulley $F^2$, when the machine will of course stop.

In order that the twine may be as densely wound as possible in the cylindrical form, and thus because of the crisscrossing of the strands be made to be self-sustaining when taken from the mandrel, much tension is applied to the friction-clutch upon the said mandrel, and in order that the twine may not slip in the haulers much tension is also applied to the spool $D^2$, the result of which is that these two friction-clutches constantly act as a brake of considerable resistance, so that when the belt is suddenly thrown on the loose pulley $F^2$ the machine almost as suddenly stops. If what we have termed the "friction-clutch," that moves the spindle upon which the cylinder is being formed, were given only a constant pressure, there would be applied only a predetermined initial stress upon the portion of the twine extending from the haulers to the cylinder that is being formed. It is plain, however, that as the cylinder increases in size, the stress upon the twine being constant, the leverage will be such as to reduce the effectiveness of the so-called "friction-clutch," and the ball will decrease in density as its size increases, and finally become very loosely wound at its outer surface. In order to prevent this, we make the stress of the spring $i^4$ automatically adjustable also in the following manner:

Upon the bolt $i^2$ is placed a collar P', having the arm P. The collar itself is cam-shaped at one end, having a groove $p^3$ cut across it, thus forming a notch upon the opposite sides, and the sides of the notch so slanted as to be adapted to engage tongues $i^5$, projecting from the end of the lever $i$, where it surrounds the bolt, as shown in Fig. 1. The arm P of this collar is connected by a rod $p$ to the upright connection $o'$, that supports the guiding-bar O. As the cylinder of twine increases in size this slide is moved farther away from the axis of the forming cylinder, which action through the connection $p$ moves the arm P and consequently the collar having the cam-shaped notches in it, and forces the parts asunder, thus applying more stress to the spring $i^4$, and consequently forcing the collar $i'$ of the friction-clutching arrangement more tightly against the friction-pad $f^3$ and the flange $f$.

Figure 17:
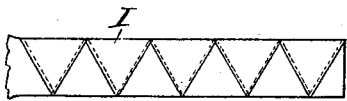
Figure 18:
Figure 19:
Figure 20:
Figure 21:
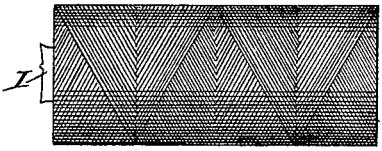

The operation of the machine is as follows: A spool of twine from any of the ordinary spinning-machines is placed upon the spindle D' and coupled to the friction clutching device, also secured to the said spindle. The frictional resistance to the rotation of the spool is then regulated, as desired, by the thumb-nut $d^9$. The twine is then carried around the haulers, as shown, and then passes downward around the sheave M and over the guide O and is secured to the spindles I. The machine is then started. The first action of the arm $l^2$, curved as it is at the top and having a notch, is to pass beneath the twine that is drawn over the guide O and slightly raise the latter into the notch $l^3$. The rotation of the haulers and of the spindle upon which the twine is wound is, as will be seen by tracing out the gearing, in such direction that the haulers will deliver the twine to the spindle. The action of the twine-laying arm is peculiar to our machine and the resulting cylinder we believe new. The result of the action of the machine in forming the ball is shown in Figs. 16, 17, 18, 19, 20, and 21. If the gearing be traced through, it will be found that the haulers and the internal rack that controls the twine-laying devices are connected by positive mechanism, and as a result the relative movements of the haulers and the twine-laying devices are constant, which true, it results that while the haulers are drawing a given number of inches of twine the twine-laying arm is moving a given distance in one direction or the other. It follows, then, that while a given length of twine is moved by the haulers the travel of the arm $l^2$ is proportional thereto, the result of which is that the movement of the twine-laying arm $l^2$ bears a certain constant relation to the circumference of the cylinder of a given diameter. The rate of movement of the periphery of the cylinder, which is of course regulated by the amount of twine that the haulers supply to it and the rate of movement of the twine-laying finger, is such that the angle of the laid strands of twine is substantially constant whatever the size of the cylinder. In Fig. 16 the naked mandrel is represented with a single spiral of twine wrapped around it from one end to the other. In Fig. 17 a second spiral is represented, and in Fig. 18 the spindle is shown wholly covered by the twine. Let it now be assumed that the cylinder represented in Fig. 17 continues to increase in size. It is evident that such enlargement cannot take place without disturbing either the pitch of the spirals of twine or changing the angle. This can be made clear by an illustration. If a machinist cuts a thread upon a one-inch shaft one-fourth-inch pitch, the thread will, as far as angle is concerned, have a definite relation to the shaft, but if he attempts to cut a thread having one-fourth-inch pitch on a two-inch shaft he will find that his angle is reduced by one-half. If, on the contrary, he attempts to cut a thread on a two-inch shaft having the same angle as the one on the one-inch shaft, he will find that he has increased his pitch to one-half inch. Let it now be remembered that the pitch of the spirals is constant, the result of which is that in a cylinder of the relative size shown in Fig. 18 and the one shown in Fig. 19, the angle remaining the same, the spirals must become fewer, and we find that while we had five spiral convolutions in Fig. 18 we will have four in Fig. 19, and in Fig. 20, as the cylinder has become larger, we find but three. In Fig. 21 the number is reduced to two. While the change from the five convolutions of Fig. 18 to the four of Fig. 19 is taking place, the twine is irregularly laid, and if the machine were stopped when a size was reached half-way between Figs. 18 and 19 there would be no finish to the surface of the balls, but the twine would be laid considerably open, because the threads would be laid somewhat apart. As the work continues, however, another finish is reached, as shown in Fig. 19. The relationship of angle and convolutions there shown will be departed from for a time, and then as the definite angle of the threads continues and the size of the cylinder becomes greater, so as to correspond with three convolutions, the finish of Fig. 20 is shown. This is repeated in Fig. 21, and if enlargement were continued the cylinder would eventually have but one pitch. We prefer to stop the machine when the finish shown in Fig. 21 is reached, and as this finish has a certain relation to the size of the cylinder we so adjust the thumb-nuts on the rod $o^3$ that when the guide O is thrown out the proper distance it shall disconnect the stop-motion and the action ceases.

It remains now but to describe the construction of the spindle upon which the cylinder is formed in order that the twine may be easily drawn therefrom. On the flange $f^2$ are thrown four double ears $q$, $q'$, $q^2$, and $q^3$. Between these are pivoted four bars that, as together they form a cylinder, may be considered staves, (lettered $r, r', r^2$, and $r^3$.) These are pivoted at $r^4$ between the angular lugs on the plate $f^2$. These so-called "staves" are provided with feet $s$, $s'$, $s^2$, and $s^3$, which feet, when the staves of this cylinder are forced outward at their free end, are adapted to strike the flange and prevent further outward movement. At the free end of the staves they are provided with inwardly-projecting inclinations $t$, $t'$, $t^2$, and $t^3$.

$u$, Fig. 11, is a nut that is adapted to lie within the barrel, as shown in Fig. 10, and $u'$ is a threaded bolt having means for turning it. It is preferably given the form of a crank.

$u^2$ is a washer adapted to lie against the ends of the staves.

With the parts as shown in Fig. 3 the twine may be wound upon the spindle. When the cylinder is completed, the bolt $u'$ may be turned so as to permit the nut $u$, having the inclined sides shown, to move farther from the end of the staves and the latter allowed to approach each other, thus reducing the mandrel at its outer end and permitting the ball to slide off easily.

Some pressure is required to prevent the guide O from falling away from the forming cylinder in case of breakage of the twine or otherwise. For this purpose a spring V is made to surround the guide-rod L and its end to press upon the arm $o'$.

The beneficial results reached may be best understood if we say that we begin our cylindrical ball with coils of a fairly coarse pitch, and as we proceed in winding increase the pitch, so that as the cylinder enlarges the twine of the outer pitches have in effect a longer reach in direction of the length of the cylinder, and thus the outer courses of the cylinder exert their strength, as it were, to prevent the lengthening of the cylinder under the pressure of said outer courses or under any other forces that would tend to extend it accordionwise.

What we claim as our invention, and desire to secure by Letters Patent, is—

1. In a twine or rope balling machine, the combination of a spool, mechanism for hauling or drawing the twine from the spool at a uniform rate, a mandrel upon which the twine is wound, gearing for imparting to said mandrel a decreasing rate of rotation so as to maintain the ball at a uniform peripheral rotation, a twine-guide traversing the mandrel lengthwise, and mechanism for moving the guide at a rate of speed that bears a constant ratio to that of the hauling mechanism.

2. In a twine or rope balling machine, the combination of a spool, mechanism for hauling or drawing the twine from the spool at a uniform rate, a mandrel upon which the twine is wound, said mandrel being driven by a shaft having a uniform rate of speed, a twine-guide traversing the mandrel lengthwise, said mandrel having a rate of movement that bears a constant ratio to that of the hauling mechanism, and mechanism intermediate the mandrel and its driver, whereby said mandrel is given a decreasing speed so as to maintain the ball at a uniform peripheral rotation.

3. In a twine or rope balling machine, the combination of a spool, mechanism for hauling or drawing the twine from the spool, a mandrel upon which the twine is wound, a mandrel-driving shaft, a twine-guide traversing the mandrel lengthwise, gearing interposed between the mandrel-driving shaft, the guide, and the hauling mechanism, whereby all three are positively driven at speeds that bear a constant ratio to each other, and mechanism intermediate the mandrel and its driver, whereby said mandrel is given a gradually-decreasing speed while the speed of the other parts named remains uniform.

4. In a twine or rope balling machine, the combination of a spool, mechanism for hauling or drawing the twine from the spool, a mandrel upon which the twine is wound, a mandrel-driving shaft, a twine-guide traversing the mandrel lengthwise, gearing interposed between the mandrel-driving shaft, the guide, and the hauling mechanism, whereby all three are positively driven at speeds that bear a constant ratio to each other, friction mechanism intermediate the mandrel and its shaft, and mechanism for interposing a gradually-increasing resistance in said driving mechanism, said friction-interposing mechanism being controlled by the ball itself.

5. In a twine or rope balling machine, the combination of a mandrel upon which the twine is wound, a positively-driven shaft on which said mandrel is carried and by which it is frictionally driven, an arm or bar bearing against the ball as it is being formed, and mechanism intermediate the arm and the mandrel, whereby the increasing diameter of the ball interposes a cumulative resistance between the drive-shaft and the mandrel.

6. In a twine or rope balling machine, the combination of a mandrel upon which the twine is wound, a positively-driven shaft by which the mandrel is carried and driven, a friction-disk splined on the shaft, a corresponding disk fixed on the mandrel, an arm or bar resting against the ball as it is being formed, a spring-pressed lever bearing against the splined disk, mechanism for adjusting the normal tension of the spring, and a connection between the arm and the spring for raising its tension above the normal as the arm is moved outward by the increasing diameter of the ball.

7. In a twine or rope balling machine, the combination of a mandrel upon which the twine is wound, a positively-driven shaft by which the mandrel is carried and driven, a friction-disk splined on the shaft, a corresponding disk fixed on the mandrel, an arm or bar resting against the ball as it is being formed, a lever bearing against the splined disk, an adjustable spring bearing against the lever, a cam interposed between the spring and the lever, and a connection between the arm and the cam, whereby the spring is automatically tightened as the increasing diameter of the ball moves the arm outward.

8. In a twine or rope balling machine, the combination of a mandrel upon which the twine is wound, a twine-guide traversing the same lengthwise, a reciprocating rack having interiorly-arranged, oppositely-facing, teeth, a gear-pinion arranged between the teeth and adapted to pass from one set to the other to reciprocate the guide, and a guide rod or bar on the rack sliding in ways on the machine-frame to prevent the pinion from leaving the rack-teeth.

9. In a twine or rope balling machine, the combination of a spool, mechanism for hauling or drawing the twine therefrom, a mandrel upon which the twine is wound, a twine-guide traversing said mandrel lengthwise, a main shaft from which said parts are driven, a shipper connecting said shaft with its driver, an arm or bar resting against the ball as it is formed, and an intermediate adjustable connection between said arm and the shipper, whereby the machine may be set to stop winding when the ball has reached a predetermined diameter.

10. In a twine or rope balling machine, the combination of a spool, mechanism for hauling or drawing the twine therefrom, a mandrel upon which the twine is wound, a twine-guide traversing said mandrel lengthwise, and a slack-belayer or pulley M around which the twine passes on its way from the hauling mechanism to the movable guide.

11. In a twine or rope balling machine, the combination of a mandrel upon which the twine is wound, a twine-supporting arm or bar lying lengthwise of and in proximity to said mandrel, and a twine-guide traversing the mandrel and supporting-arm, said guide having a notch for the twine to pass above the upper edge of the arm, and horns on either side of the notch extending below the edge of the arm.

12. In a twine or rope balling machine, the mandrel I, a driving-shaft therefor, a friction device connecting said mandrel and shaft, means for varying the frictional resistance between said parts, and means controlled by the ball as it is being formed for increasing the pressure of the friction device as the diameter of the ball enlarges.

13. In a twine or rope balling machine, the combination of a spool, a mandrel upon which the twine is wound, a positively-driven device for hauling or drawing the twine from the spool, a positively-driven shaft supporting and driving the mandrel, a positively-driven twine-guide traversing the mandrel lengthwise, a differential-speed friction-driving mechanism interposed between the mandrel and its shaft, and means for automatically controlling said friction-driving mechanism.

14. In a mandrel for twine and rope balling machines, the combination of a plurality of longitudinal rods or staves, pivoted at one end and provided on their inner sides at the other end with inclined lugs, a washer abutting against the free ends of the rods or staves, a cam-nut coöperating with the interior lugs, and means reacting between the nut and the washer whereby the nut is engaged with the lugs and the rods or staves pushed outward.

15. In a mandrel for twine or rope balling machines, the combination of a disk, a plurality of rods or staves pivoted thereto and projecting outward from the face thereof, the inner ends of said staves projecting substantially parallel with the plate and forming stops to limit the outward movement of the staves, inclined lugs on the inner sides of the free ends of the staves, a washer abutting against the outer ends of the staves, a cam-nut coöperating with the interior lugs, and a thumb-screw taking into the nut and serving to push the staves outward by engaging the inclined sides of the lugs.

16. In a twine or rope balling machine, the combination of the guide by means of which the twine is laid on the mandrel, the haulers that draw the twine from the spool, the gear G, pinions G' and $G^2$ that drive the haulers, and the pinion $G^4$ on the shaft $G^3$ of the pinion $G^2$ for reciprocating the twine-guide.

17. In a twine or rope balling machine, the combination of the mandrel, the fixed rod L, the twine-support O pivoted on the rod and extending lengthwise the mandrel, the twine-guide traveling along the support, and means for reciprocating the guide, said guide being pivoted coincidently with the support on the rod L.

18. In a twine or rope balling machine, the combination of the haulers by means of which the twine is drawn from the spool, the twine-guide by means of which the twine is laid on the mandrel, the gear-rack for reciprocating the guide, the pinion $G^4$ engaging the teeth of the rack, the shaft $G^3$ carrying said pinion $G^2$ on the other end of the shaft meshing with the gear that drives the haulers.

19. In a twine or rope balling machine, the combination of the mandrel, the rod L parallel therewith, the twine-support O extending lengthwise the mandrel and pivoted at its ends on the rod, the twine-guide $l^2$ also pivoted on the rod and resting at its outer end on the support, and means for reciprocating the guide on the rod between the end pieces of the support.

20. In a twine or rope balling machine, the combination of the mandrel, the twine-support O, the fixed rod L having the support pivoted on it and extending the length of the mandrel, and the reciprocating twine-guide $l^2$ also pivoted on the rod L, said guide having the notch $l^3$ and ears on each side of the notch extending below the upper edge of the support.

21. In a twine or rope balling machine, the combination of a mandrel on which the twine is wound, a shaft on which said mandrel is loosely carried and by which it is driven, a friction-disk splined to the shaft, a coöperating friction-disk on the mandrel, a lever pivoted to the frame and bearing against the disk on the shaft, a spring bearing against and pressing the lever to the disk, and means for varying the tension of the spring.

22. In a twine or rope balling machine, the combination of a spool-support comprising a spindle carrying a fixed disk, a friction-disk adapted for releasable connection with the spool, means for regulating the degree of frictional contact between the two disks, and mechanism for hauling or drawing the twine from the spool and winding it on a mandrel.

GEORGE H. ELLIS.
JOHN F. STEWARD.

Witnesses:
ARTHUR JOHNSON,
R. ROY SHUMAN.